Dec. 25, 1945.  J. S. DENISON  2,391,396
DRILL
Filed April 27, 1942  2 Sheets-Sheet 1
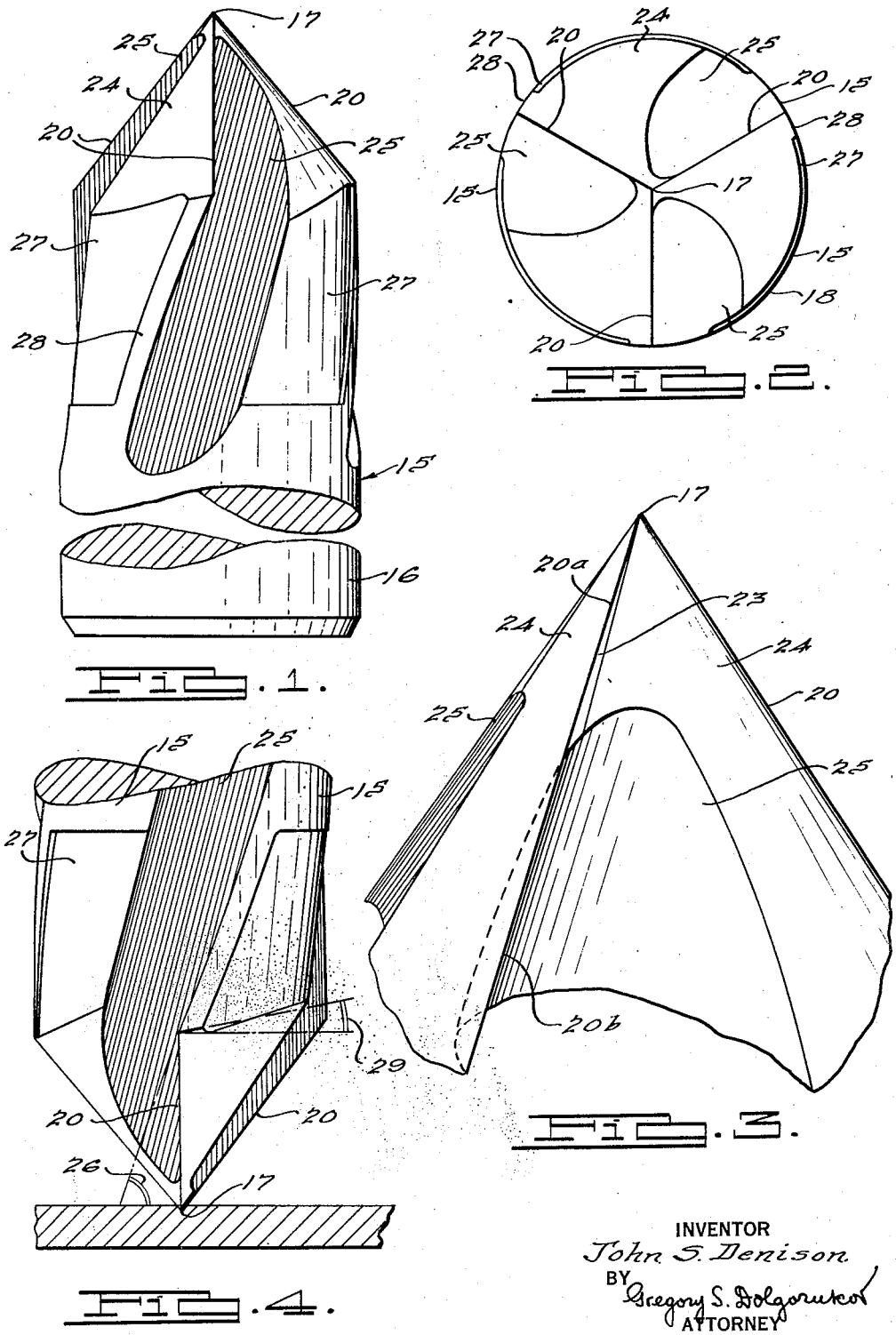
INVENTOR
John S. Denison
BY Gregory S. Dolgorukof
ATTORNEY

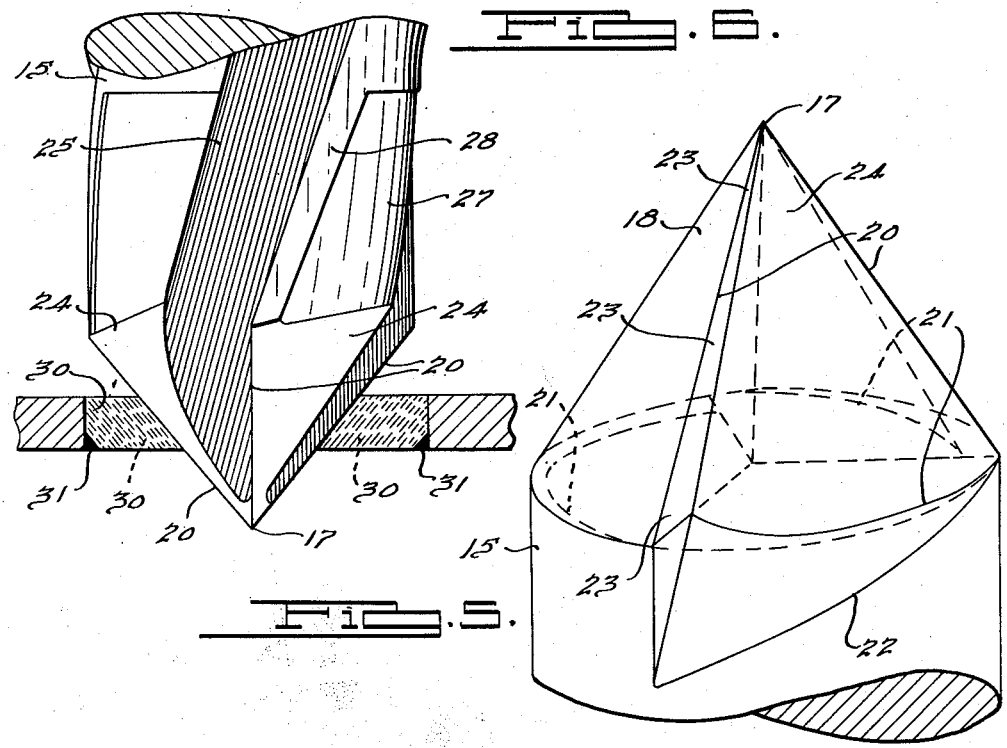

Patented Dec. 25, 1945

2,391,396

UNITED STATES PATENT OFFICE 2,391,396

DRILL

John S. Denison, Mellen, Wis.

Application April 27, 1942, Serial No. 440,648

2 Claims. (Cl. 77—67)

This invention relates to drills and more particularly, but not exclusively, to an improved drill for drilling holes in sheets of various materials such as metals. In one of its aspects the invention also contemplates providing an improved method of making riveted joints or connections.

Drilling operations, including those in sheet materials, are usually performed with the aid of so-called "twist drills." A twist drill usually comprises a fluted cylindrical body having one end adapted to be held in a gripping device such as a chuck, while on the other end of said body there is formed a working end having a plurality of cutting lips provided thereon.

For drilling relatively deep holes, i. e., when used on relatively thick metal blocks, such drills give very satisfactory service. In fact, a twist drill is considered to be the most efficient cutting tool, since it carries more load proportionally to its size than any other tool. This is due to the fact that in operation, while drilling a relatively deep hole, a twist drill is supported during the larger part of the operation by the metal upon which it is operating and thus is prevented from springing away from the work, or prematurely breaking through the work. If properly ground, a twist drill removes the metal with relative ease in the form of a regularly forming chip.

However, in spite of their efficiency conventional twist drills have a number of serious disadvantages. Grinding of such drills is an operation of great exactness and it is difficult to perform by hand. As a result of even a slight mistake in grinding various vital angles on a twist drill, it may drill a hole larger than its own diameter, form an inaccurate and rough hole incorrectly placed on the work. One of the most serious disadvantages of the twist drills is the lack of self-centering ability in consequence whereof a drill, even after being first located correctly, may in operation "pull" to one side, displacing the hole, distorting the contour or cross section of the hole or causing breakage of the drill. In addition, proper locating of such a drill is difficult, since it does not come to a point, and unless a special jig having drill guiding sleeve is provided, a drill may move from its mark for a considerable distance even before the hole has been fully originated.

Moreover being primarily designed for efficient operation on deep holes, twist drills are very difficult to use on sheet metal, and great difficulties arise in such use of twist drills, particularly when a large number of relatively small holes have to be rapidly drilled in sheet metal the surface of which is somewhat inclined with respect to the axis of the drill. Such conditions often exist in aircraft work, and serious delays and much scrap occur due to the unsuitability of conventional twist drills for such work. In aircraft sheet metal work, in which small diameter twist drills are used in many instances, such drills often slip or "wander away" on their dead centers, giving improper positioning of holes. An additional and serious difficulty results from the tendency of such drills to break through the work before the hole is fully drilled, and to form large irregular burrs on the opposite side of the sheet. This results from the fact that a two-flute drill, being supported in the work along two opposite lines, exerts on such lines very high local pressures, and as soon as the center of the drill end pierces the sheet, the metal between such place of piercing and the would be periphery of the hole becomes (in spite of its considerable width) unable to resist such high local pressures and collapses along said two lines permitting the drill to go fully through the work without finishing the drilling, pushing relatively large portions of the metal outwardly and to the sides, thus forming large torn burrs.

One of the objects of the present invention is to provide an improved drill which originates the hole exactly at the point where it is placed and does not wander away from such point.

Another object of the invention is to provide an improved drill in which the cone surfaces forming the lip clearance as well as the cutting edges of the lips come to a single point, and therefore a very small mark provided on the metal surface with the aid of a hand punch or a sharp tooth wheel, where providing a row of such holes is desirable, is sufficient to provide a foothold for the drill and to originate or locate the hole.

Still another object of the invention is to provide an improved drill which is self-centering in operation and does not produce within itself forces acting transversely of the drill and pushing or pulling it to one side, elongating the hole or causing one of the lips to carry a greater burden than the rest of them.

A further object of the present invention is to provide a drill which is transversely balanced in its operation and consequently does not require a jig for holding and guiding it along its feeding line.

A still further object of the invention is to provide an improved drill which comes to substantially one point at its working end and in which the cutting lips have sharp cutting edges extending all the way from the periphery of the drill to said point.

A still further object of the invention is to provide an improved drill which is adapted to drill a hole of a true circular outline and without elongating the hole or increasing the diameter thereof because of insufficient centering ability of the drill.

A still further object of the invention is to provide an improved drill which does not break through the metal sheet during a drilling operation until drilling of the hole is practically completed, whereby formation of large irregular burrs on the opposite side of the sheet is substantially prevented.

A still further object of the invention is to provide an improved drill which at the end of the drilling operation goes through the last portion of the metal easily and without excessive jerk, eliminating the danger of breaking the drill.

A still further object of the invention is to provide an improved drill which can be formed by simple machining operations performed by semi-skilled or even unskilled workmen with the aid of comparatively inexpensive tools.

A still further object of the invention is to provide an improved drill which is less susceptible of being spoiled by small irregularities of grinding than are conventional twist drills.

A still further object of the invention is to provide an improved sheet metal drill which enables drilling more perfect holes in metal sheets than it is possible to do with conventional drills.

A still further object of the invention is to provide an improved drill particularly for sheet metal work, which drill can be quickly and easily sharpened and refluted by an unskilled or semi-skilled workman, and which can be repeatedly sharpened using up practically the entire body of the drill without changing the character thereof. It is well appreciated in the art that grinding of conventional twist drills is an operation of great nicety requiring high skill, and that after a number of grindings thicker portions of the web are reached, giving longer and longer central lip clearance meeting edge, which makes it more and more difficult to originate a hole and to drill the same.

A still further object of the present invention is to provide an improved sheet metal drill which produces in operation an orderly flowing and properly curling metal chip; which does not require excessively high pressures for penetrating into metal for taking cuts of proper thickness; which does not generate excessive heat destroying temper of the drill and often producing breakage; and which does not wedge into the sheet metal, bending the edges of the sheet around the hole thereby producing curling burrs. It is appreciated in the art that when attempts are made to use for originating and drilling holes in metal sheets a tool known in the trade as pointed "countersink," such tool wedges into thin sheets, forming a curling torn burr on the opposite side of the sheet, burns and inevitably breaks the cutting edges of the drill particularly near the periphery of the drill if drilling thicker sheets is attempted and necessary pressure is applied to such tool. Such pointed countersink tool, while giving satisfactory service in "chamfering" holes, i. e., removing square corners at holes already fully drilled in metal blocks, cannot be efficiently or successfully used for drilling sheet metal due to their sharp included angle, lack of helical flutes on the body, absence of rake angle at the cutting lips and relief on the cylindrical portion of the body.

It is an added object of the present invention to provide an improved drill which is simple in construction, dependable in operation and easy to make.

Other objects of this invention will appear in the following description and appended claims, reference being had to the accompanying drawings forming a part of this specification wherein like reference characters designate corresponding parts in the several views.

Fig. 1 is a side view of a sheet metal drill constructed in accordance with the present invention.

Fig. 2 is a top view of the drill shown in Fig. 1, the observer looking on the pointed end of the drill.

Fig. 3 is a perspective view showing the extremity of the tip of the same drill on a greatly enlarged scale.

Fig. 4 is a view illustrating the beginning of the drilling operation on a sheet of material.

Fig. 5 illustrates the drill and the sheet of material, the drilling operation being well under way.

Fig. 6 is a geometric construction illustrating the way in which the lip clearance surface may be formed on the drill end.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is shown, by way of example, an improved drill particularly but not exclusively adapted for drilling holes in sheets of various materials such as metal. The drawings also illustrate an improved method of grinding said drill as well as an improved method of laying out and originating rivet holes in riveted seams or joints, and an improved tool or device for such laying out and originating rivet holes.

Referring now more particularly to Figs. 1 to 3 of the drawings, the drill illustrated therein comprises a cylindrical body 15, the end 16 of which is adapted to be held in any suitable gripping device such as a drilling or turning chuck. The end 16 may be of either cylindrical shape for drills of smaller diameters such as those of less than ¼ of an inch in diameter, while for drills of larger diameters it may be tapered and provided with a tang. The opposite end of the body 15 is made of a converging preferably conical shape and has a point or a vertex indicated by the numeral 17. For the purpose of understanding geometric construction of the drill structure it may be considered that the top of the cylindrical body 15 and the base of the structural cone indicated by the numeral 18 coincides with each other and are coextensive, as shown in Fig. 6. On the conical end of the body 15 or on the surface of the constructional cone 18 there is provided a plurality, in the present instance three equidistantly arranged cutting edges 20 coinciding with the surface of the cone 18 and extending from the vertex 17 thereof to the periphery of the base and the cylindrical surface of the body 15. Back of the cutting edges 20 the surface of the constructional cone 18 is relieved to form lip clearance surfaces 24, said lip clearance surfaces being originated by a line revolving around the vertex 17 as the center and sweeping a surface which in crossing the base of the cone forms a curve, preferably a spiral 21, and intersects the cylindrical surface of the body 15 along the line 22, see Fig. 6. The magnitude of the lip clearance angle depends upon various conditions, including the intended material of the work, and selection thereof is well known in the art. A lip clearance angle of approximately 12° gives good results for average conditions. As can be clearly seen from an examination of Fig. 6 wherein for the purposes of simplicity of the drawings only one lip clearance recess is shown, the lip clearance surface 24 extends from the cutting edge 20 to the surface 23, which surface extends inwardly of the cone and intersects the surface thereof along the respective cutting edge 20. The surface 23 may under certain conditions be somewhat undercut to form the desired rake angle on the cutting lip. Such a construction is particularly adapted for very small sized drills. For larger size drills, such as ⅛ of an inch and over, it is desirable to provide on the body 15 a plurality of helical flutes such as flutes 25 which intersect the lip clearance surfaces 24 along the cutting edges 20. When so provided, the flutes 25 serve a double purpose, namely they provide an easily formed and reground rake angle on the cutting lips and also provide means namely conduits serving to dispose of the chip by curling the same and sending it up, which is to say toward the shank 16 of the drill. Selection of the proper rake angle on the drill depends among other things upon the intended material of the work and is well known in the art. The rake angle may be defined as an angle which the flute makes with the work, and it is illustrated in Fig. 4 wherein it is designated by the numeral 26. A body relief of clearance 27 is provided on the cylindrical body 15 between the adjacent flutes leaving only the margin 28 as an element of the original constructional cylinder determining the diameter of the drill. The lip clearance angle may be conveniently measured at the margin 28 as illustrated in Fig. 4, wherein it is designated by the numeral 29.

By virtue of the above described construction there is provided a drill in which all of the cutting edges 20 come together or meet at substantially a single point or vertex 17, said vertex or point of the drill end being as sharp as practical. Provision of such a pointed end on the drill serves a very important purpose, particularly in drilling sheet metal with the aid of manually manipulated drilling devices.

It is well appreciated in the art that the lip clearance surfaces of a conventional twist drill meet along a straight line edge extending parallel with the surface of the work. This edge may be of considerable length and should the drill not be exactly perpendicular to the surface of the work when the drilling operation begins, the rotating drill may "wander away" from its predetermined or desired starting position. This condition occurs particularly when the pressure on the drill is relatively light and where the drill is not guided along its feeding line with the aid of a jig having suitable sleeves, as is the condition when hand drilling devices are used. In providing riveted joints in aircraft constructions it is often necessary to drill a large number of small holes at such localities of a structure where it may be very difficult or impossible to hold the drill exactly perpendicular to the surface of the work. Under such conditions it is extremely difficult to secure proper location of rivet holes and various difficulties arise from the above condition. With a drill embodying the present invention and having its working end coming to a single point, a very small indentation or mark is sufficient to provide a foothold for the drill and to prevent its wandering away. Provision of such a mark which, in fact, is the operation of originating the hole may be done either with the aid of the drill itself or with the aid of a suitable tool hereinafter described in detail. The included angle of the constructional cone 18 may vary depending upon the condition from approximately 60° to 140° depending upon the material, its character and thickness of the sheets. For average conditions an angle of approximately 90° gives good results.

It will now be understood in view of the foregoing that when the drill is applied to the work rotation of the drill together with the pressure exerted on the drill along its axis toward the work operates to bring the cutting edges 20 into contact with the sides of the conical mark or indentation, enlarging said mark by scraping the metal off its sides as the drill rotates. The scraping action is effected by the portions 20a of the cutting edges 20 which portions are formed by the surfaces 23 and 24 as can be clearly seen from an examination of Fig. 3. The rake angle on the cutting lip along said portion 20a of the cutting edge is relatively small and therefore the edge 20a is sufficiently strong to withstand pressure exerted on the drill and carried at the beginning of the drilling operation only by the extremity of the drill. Attempts to provide rake angles to the very tip 17 of the working end of the drill would weaken the cutting lip at said tip to such an extent that said point might break off when even light pressure would be applied to it, thereby destroying the above discussed advantages of the drill.

It is appreciated in the art that a cutting lip having no rake angle may under certain conditions be very inefficient in cutting. However, in the drill constructed in accordance with the present invention the duration of the period during which the portion 20a of the cutting edge 20 operates to cut the metal is relatively short and soon after the commencing of the drilling operation said point breaks through the sheet and comes out on the opposite side thereof. Thereupon the portions 20b of the cutting edges 20 come in contact with the sides of the hole being drilled, said portions 20b being provided with the proper rake angle. Therefore, further drilling of the hole is very efficient and an orderly chip properly curled and disposed of is formed by the drill.

Referring now to Fig. 5, it can be understood from an examination of said figure that due to the fact that the included angle of the conical working end of the drill constructed in accordance with the present invention is usually less than the angle of the conventional twist drill, the pressure force acting along the longitudinal axis of the drill produces at the cutting lips or edges 20 of said drill considerable side components or forces acting perpendicularly of the axis of the drill. By combining in the present improved drill a cutting lip having a proper rake angle and an included angle giving a considerable side force or component, drilling of the hole is effected by taking the chips from the sides of the hole rather than from the bottom thereof as is the case with conventional drills, and therefore the pressure exerted by the lip of the drill is transmitted largely to the sheet and is easily carried thereby since such forces act more in a direction of the sheet plane rather than transversely thereof. This produces very orderly cuts taken substantially along the dotted lines 30 representing the lines of separation of the chip from the material of the sheet as the drilling operation proceeds.

In conventional twist drills having very large included angle of the working end cone, the side components produced by the cutting lip of the drill is very small and therefore practically the entire pressure force exerted by the drill is to be resisted by the sheet in the direction perpendicular to the surface thereof, which is to say in a direction representing the line of the least resistance of the sheet to bending. Because of the above condition and also due to the fact that conventional twist drills have only two cutting lips, extremely high local pressures are exerted by the cutting lips on the material of the sheet transversely to the sheet surface. Due to such high local pressures the material of the sheet becomes unable to support the cutting edges already after a few turns of the drills and collapses permitting the drill to go all the way through the metal considerably before the drilling operation is completed. Thus holes in relatively thin sheets and particularly with softer materials are not drilled to a true circular outline by conventional drills but are, in fact, torn through the metal. In other words, while conventional two-lip drills take cuts from the bottom of the holes, the drills constructed in accordance with the present invention take chips from the sides thereof which are capable of resisting considerable pressure and therefore the chips come out in a regular orderly way. Thus the drills constructed in accordance with the present invention are supported by the sheet metal even in cases where such sheets are relatively thin, and therefore the efficiency of the present drill is greatly improved compared with conventional twist drills.

It is important to appreciate that the above advantage can be fully realized only when proper rake angle is provided on the cutting lips or edges 20. Lack of such a rake angle, which might be the case if no helical flutes were provided and the surfaces 23 were permitted to extend all the way to the periphery of the cylinder as is shown in Fig. 6, cutting action of the lips would not be efficient. While such inefficiency in cutting could be tolerated in cases where only very light scraping action is necessary such as in scraping of corners of holes provided in solid blocks or "chamfering" operations for which conventional pointed countersinks are used, it will disorganize operation of the drill intended for drilling holes in sheet metal. Increased pressure on the sides of the hole in a thin metal sheet coupled with ineffective cutting lips will require more and more pressure to cause the lip to dig into the metal, and when such pressure is exerted, the drill will operate simply to scrape off and to thin the edges of the sheet at the hole and to curl said edges forming a burr on the opposite side of the sheet. If, however, relatively thick sheets are attempted to be drilled with a drill having no rake angle, the inefficiency of cutting, coupled with the great pressure exerted on the drill and the accompanying friction will heat the edges particularly near the periphery of the drill where the edge travels a greater distance in a unit of time than portions thereof near its center. Such heating of the cutting edges will cause them to lose their temper very rapidly and to chip off after relatively short use.

With the use of drills constructed in accordance with the present invention the cutting edges of the drill are adapted to take cuts of proper depth and to form a proper chip curling the same and sending it upwardly through the flute, thereby disposing of the chip continuously. Moreover due to the fact that the feeding pressure force produces considerable side components, the pressure on the material in the direction of the axis of the drill is greatly reduced. In addition the force acting through the drill is distributed not between the two cutting edges as is the case with conventional drills, but among three of said cutting edges giving a decreased load for individual lips Thus, the pressure on the material of the sheet along the axis of the drill is very light and the entire hole may be drilled before the marginal portions of the material become unable to support the cutting edges. Such conditions occur only when the drill reaches portions designated in Fig. 5 by the numerals 31, and shaded solid black for distinctness. It is only when practically the entire hole is already completed that the portions 31 being still integral with the remainder of the sheet collapse and the drill goes all the way through the sheet. However, the portions 31 are very small and are easily reamed by the action of the drill and they do not form any appreciable burr on the opposite side of the sheet.

The above explained advantage may be easily verified by making a graphical analysis of forces acting on the portions 31, and treating said portions as uniformly loaded cantilever beams. By such an analysis, herein omitted for the sake of simplifying the specification, it can be clearly shown that by decreasing the included angle of the drill point the vertical component of the pressure force and consequently the bending moment produced thereby are greatly decreased, while the length of the beam for the same cross section thereof at its root is also greatly decreased thereby increasing the strength and resistance of the beam. By virtue of such an action, drills constructed in accordance with the present invention can drill holes of true circular outline in relatively thin metal sheets without bending said sheets or forming objectionable burrs thereon.

The provision in the drill embodying the present invention of at least three cutting lips instead of two and particularly combining said feature with a pointed extremity enables attainment of an additional advantage, namely imparting to the drill a self-centering ability which prevents the drill from departing from its proper position in the process of drilling, thereby dispensing with the necessity of using complicated jigs or similar devices for guiding the drill as is required for conventional two lip drills. The self centering ability of the present drill results from its constant support in drilling along three or more equidistant points, or lines, all lying on circles concentric with the circle of the drilled hole. It is well known in the art that it takes at least three points to define a circle and that such three points define only one definite circle, while two points do not define any definite circle and an infinitely large number of circles may be drawn through two given points.

It will thus be seen that in drilling a hole through a sheet of material the drills constructed in accordance with the present invention operate in three successive stages; first, forming of a slight conical centering indentation; second, drilling the hole at the place of said indentation by scraping the material from the bottom of said indentation with the central extremities of the cutting lips forming substantially 90 degree angles with the work; and third, reaming the hole by removing the material from the sides of the hole with the middle and peripheral portions of the cutting lips having a predetermined rake angle. Thus the single working end of the drill successively performs in drilling a single hole the functions of three different tools; namely, those of a center punch originating a conical indentation on the sheet surface due to the pressure exerted on the drill and irrespective of its rotation, a drill forming the hole through the thickness of the sheet by removing the material from the bottom of the indentation, and finally the function of a reamer which brings the size of the hole to its desired or nominal dimension by removing the material with its smaller rake angle portions of the cutting lips operating to remove the material from the sides rather than the bottom of the hole. The vital angles of the end elements change along the radius of the conical end to insure their required strength and efficient removal of the material.

Thus the objects of the present invention listed above and numerous additional advantages are attained, and drilling operations and provisions of riveted joints are made more efficient and effect work of better quality.

I claim:

1. In a drill, a cylindrical body, a conical working end on said body, said body having a plurality of helical flutes provided in its working end, a corresponding plurality of cutting lips formed on said end, the cutting edges of all of said lips being straight and meeting substantially at the vertex of said conical end, the included angle of said conical end being within the range between 65° and 120°, said flutes terminating at a predetermined distance from said vertex.

2. In a drill, a solid cylindrical body, a conical working end provided on said body, a plurality of cutting lips formed on said end, the cutting edges of said lips being straight and meeting substantially at a single central point, said body having a corresponding plurality of flutes formed in said working end, said flutes determining the rake angle of said cutting lips from the periphery of the drill to within a predetermined distance from said central point.

JOHN S. DENISON.